United States Patent Office 3,332,811
Patented July 25, 1967

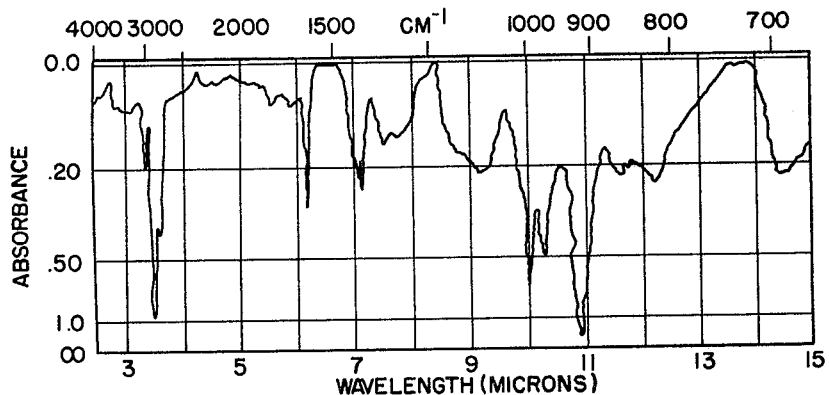
FIG.-I
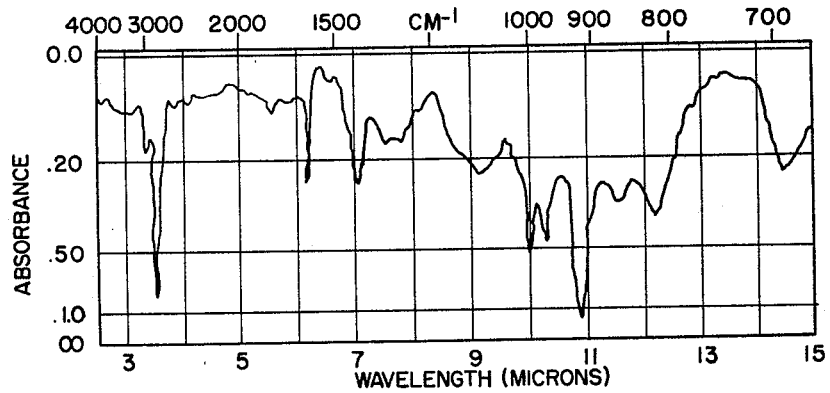
FIG.-II
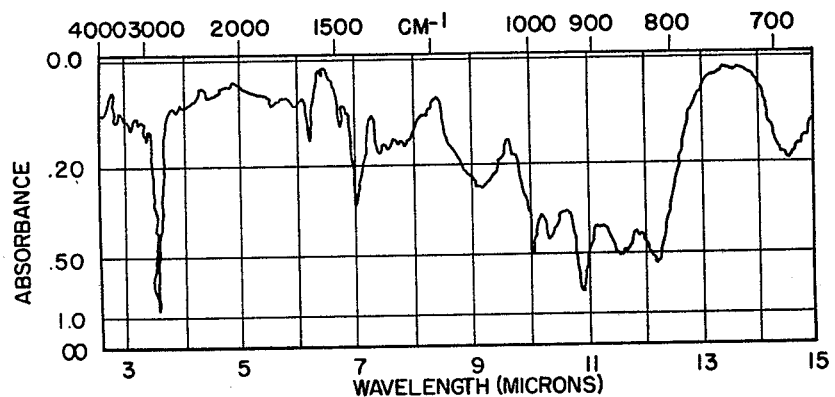
FIG.-III
Donald A. Guthrie
John P. Longwell   Inventors
By R. D. Manahan
Patent Attorney

3,332,811
HYDROCARBON POLYMERS CONTAINING
NF₂ GROUPS
Donald A. Guthrie, Cranford, and John P. Longwell,
Scotch Plains, N.J., assignors to Esso Research and
Engineering Company, a corporation of Delaware
Filed June 14, 1960, Ser. No. 36,084
7 Claims. (Cl. 149—109)

The present invention relates to high energy polymers useful as oxidant-binders in solid rocket propellants and the preparation thereof. In one aspect of the invention tetrafluorohydrazine is added to unsaturated bonds in high molecular weight organic polymers, such as polybutadiene. In another aspect of the invention the addition takes place in the presence of ionizing radiation. Still another aspect of the invention concerns the use of these novel polymers as binders in rocket propellants.

Binders are frequently employed in solid rocket propellants to impart strength and rigidity. Most of the binders, e.g. natural rubber, polybutadiene, etc., have very little fuel value in comparison to fuels such as boron or aluminum. They, of course, also have no oxidizer properties. Yet it is frequently necessary to compound up to 30 wt. percent of such binders with an oxidizer and a fuel in order to obtain a propellant having the required physical properties.

An object of this invention is to introduce difluoroamino groups into unsaturated polymers. Another object is to provide a binder having oxidizing properties that is useful in high energy propellants.

It has now been found that difluoroamino groups can be introduced into unsaturated polymers by the addition of tetrafluorohydrazine. One method of making these novel oxidizers involves reacting substantially pure tetrafluorohydrazine with a solution of an unsaturated polymer under superatmospheric pressure, e.g. 200 to 750 p.s.i.a., and at an elevated temperature, e.g. 60° to 100° C., for about ½ to 18 hours. Under these conditions there is a mixed phase in the reaction vessel, i.e. a liquid and a gas phase. Pressurizing the reaction vessel with N₂F₄ increases the reaction rate and favors the addition of a larger number of difluoroamino radicals. Where yield or reaction time is not critical, pressures of 1 atmosphere or less can be employed with temperatures as low as 0° C. or as high as 150° C. for up to 24 hours or more. The use of ionizing radiation promotes the reaction, particularly at the low to moderate temperatures, e.g. room temperature.

FIGURES I, II and III are infrared absorption curves of a mixed 1,2- and 1,4-polybutadiene modified in accordance with this invention.

The amount of tetrafluorohydrazine used will vary according to the number of radicals to be added to the polymer molecule as well as the number of available unsaturated bonds. It is best to use an excess of the N₂F₄ reactant, i.e. up to 30 or 40 moles per double bond in the polymer, rather than the stoichiometric amount when it is desirable to add a substantial number of radicals to the polymer, i.e. so that the product contains at least 40 wt. percent NF₂. A suitable feed ratio is about 3 to 10 moles of N₂F₄ per double bond in each polymer molecule. Of course, a lower ratio may be used, i.e. as little as 0.1 mole of N₂F₄ per double bond. If the NF₂ radicals add to the pendant vinyl groups, such as those in 1,2-polybutadiene, the polymer molecule has a number of

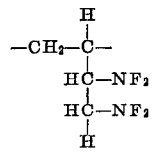

units; if the NF₂ radicals add to the backbone unsaturation, such as 1,4-polybutadiene has, the polymer will contain

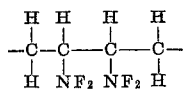

units.

An outstanding polymer binder contains about 1 NF₂ group (or more) for every 3 carbon atoms. This is equivalent to about 55 to 65 wt. percent NF₂ in a hydrocarbon polymer having a high degree of unsaturation, i.e. an iodine number of at least 200. Useful binders may contain as few as 1 NF₂ group for every 6 carbon atoms (ca. 40 wt. percent NF₂) and therefore it is not intended to exclude these or even lower energy substances from the invention. In fact, polymers containing as little as 5 or 10 wt. percent NF₂ are vastly superior in energy content to conventional binders.

Among the unsaturated polymers that may be used are those having carbon-carbon backbones and an iodine number of at least 10 and preferably at least 200, e.g. 200 to 400. Aside from natural rubber and natural resins, the synthetic polymers that can be modified in accordance with the present invention are made from conjugated and nonconjugated C₄ to C₆ diolefins, such as butadiene-1,3, isoprene, chloroprene, pentadiene-1,4, hexadiene-1,5 and mixtures thereof with themselves or C₂ to C₈ monoolefins, such as ethylene, propylene, isobutylene and styrene. Suitable polymers and copolymers include cis-1,4-polybutadiene rubber, trans-1,4-polybutadiene rubber, mixed (1,2 and 1,4-polybutadiene rubbers, polychloroprene rubber and cis or trans 1,4-polyisoprenes. Lower energy binders may be prepared by adding tetrafluorohydrazine to low unsaturation hydrocarbon polymers, such as butyl rubber, which is a copolymer comprising about 95–99 wt. percent isobutylene and 1 to 5 wt. percent isoprene, (75%) butadiene- (20%) styrene resin and petroleum resins made from highly unsaturated fractions obtained from a steam cracker. The unsaturated polymers may have a viscosity average molecular weight as low as 100 or 200 or as high as 2,000,000 or more.

The preferred polymers are high unsaturation hydrocarbon rubbers, such as the polybutadienes, polyisoprenes and natural rubbers, that have molecular weights of about 1000 to 100,000.

Since many of the polymers are solids, it is generally necessary to dissolve the ploymer in a suitable inert solvent to promote the reaction and facilitate handling. Examples of solvents which can be used for this purpose are C₅ to C₁₀ liquid hydrocarbons, such as benzene, toluene, xylene, n-hexane and n-heptane, and C₁ to C₆ halogenated hydrocarbons, such as chloroform, dichloromethane, carbon tetrachloride, dichloroethane and chlorobenzene as well as nitro compounds, such as nitrobenzene and nitromethane. The solvent should be substantially free of water since this is an undesirable contaminant in the reaction zone.

The amount of solvent used will depend to some extent on the solubility of the polymer in the solvent. For example, a low molecular weight polymer may be admixed with a small amount of solvent to reduce its viscosity. On the other hand, some high molecular weight polymers are only slightly soluble in the conventional polymer solvents and in such cases the polymer solution may be quite dilute, that is to say they contain not more than about 20 wt. percent polymer. Thus, while it is possible in some instances to use polymer solutions of 60 wt. percent or more, it will commonly be found that the most useful polymer concentrations are between about 5 and 40 wt. percent.

Upon completion of the reaction, which may be effected in any suitable vessel such as a stainless steel bomb, the excess tetrafluorohydrazine is recovered in a trap, which is maintained at a sufficiently low temperature to condense the tetrafluorohydrazine gas. The recovered liquefied gas can be recycled to the reaction zone. The polymer may precipitate during the reaction and when this occurs it may be recovered by filtration and washing. Sometimes the modified polymer or at least a portion of it remains dissolved in the solvent and it is necessary to flash or distill the solvent to recover all the polymer product. In order to facilitate the separation of the soluble polymer from the solvent, it is advisable to use a low boiling inert solvent such as those boiling below 150° C. Alternatively, the dissolved modified polymer in the reaction mixture may be recovered by adding a nonsolvent, such as a low molecular weight aliphatic alcohol to the mixture to precipitate the product.

As mentioned above, ionizing radiation can be utilized to promote the modification of the polymer, especially where low reaction temperatures are employed. While radiation doses of from 0.1 to 30 mr. can be used for this purpose, doses of 1 to 20 mr. are more frequently used for this purpose. The dose rate may vary from as low as 50,000 R/hr. to as high as 10,000,000 R/hr. Among the types of radiation that are suitable are high energy electromagnetic radiations, such as gamma rays and X-rays. In general, high velocity electrons, high energy gamma rays and neutrons are preferred mainly because of the high penetrating power of these rays and/or availability and ease of application of these sources of energy. By high energy ionizing radiation is meant the radiation from terrestrial sources of sufficient energy that the dose rate is at least $1 \times 10^4$ R/hr. This excludes radiation such as cosmic and ultraviolet light which are ineffectual for the purposes of this invention. A suitable source of ionizing radiation is radioactive Cobalt 60 which emits gamma rays.

In a preferred embodiment of the invention a high molecular weight unsaturated polymer, such as polybutadiene, is dissolved in chloroform or benzene to make a 10 to 30 wt. percent solution which is then introduced into a vessel capable of withstanding pressures of up to about 500 p.s.i. The reaction vessel is cooled with liquid nitrogen, and the air in the vessel is removed with a vacuum pump. About 3 to 10 moles of tetrafluorohydrazine (based on polymer unsaturation) is then introduced into the reaction vessel and it is warmed to about 25 to 100° C. The pressure of the tetrafluorohydrazine in the vessel at this stage is approximately 300 to 400 p.s.i.a. The bomb is then shaken or the solution is otherwise agitated for about 1 to 8 hours and thereafter the unreacted tetrafluorohydrazine is released from the bomb and recovered in a liquid nitrogen trap. The product may be recovered in either of two ways. Either a sufficient amount of nonsolvent, such as methyl alcohol, can be added to the modified polymer to completely precipitate the product which is then recovered by filtration and washed with additional alcohol, or the polymer may be isolated by stripping the solvent in vacuo.

The modified polymers are generally impact sensitive and therefore must be handled with care. They can be compounded with rocket propellant ingredients, such as 1,2,3-tris (difluoroamino) propane, 1,2,3,4-tetrakis (difluoroamino) butane, tetranitromethane, hexanitroethane, ammonium perchlorate, nitronium perchlorate and sufficient lithium, boron, beryllium or aluminum to produce solid propellants having specific impulses of approximately 270 to 300. A typical rocket propellant formula using polybutadiene containing approximately 3 carbon atoms per difluoroamino radical is as follows:

| Ingredients: | Weight percent |
| --- | --- |
| Tetrakis difluoroamino butane | 29.9 |
| Hexanitroethane | 34.1 |
| Boron | 6.0 |
| Polybutadiene-$N_2F_4$ adduct | 30.0 |

If the modified polymer is a low molecular weight (300 to 2000) polymer, it may be admixed with the other propellant ingredients and cured by gamma radiation, (e.g. $5 \times 10^4$ to $5 \times 10^8$ R) at approximately room temperature in place in a rocket's combustion chamber. Higher molecular weight polymers may require the addition of solvents or plasticizing agents to facilitate processing. Curing of the mix in the rocket motor can also be accomplished by the addition of conventional cross-linking agents, such as sulfur, which react on heating.

Aside from using the modified polymers as binders in rocket propellants, they are also useful as detonating agents and explosives. The polymers usually contain a substantial amount of residual unsaturation and therefore are easily cross-linked with known curing agents to produce explosives having good physical properties.

The following examples are given in order to afford a better understanding of the invention and how these novel polymers may be prepared.

*Example 1*

A 19.4 wt. percent solution in benzene polyisoprene (3500 molecular weight) prepared by the sodium polymerization process was reacted with tetrafluorohydrazine at room temperature (23° C.) and subatmospheric pressure in a 583 ml. tapered glass vessel equipped with a stopcock. The solution (6.65 gm., 0.0190 mole double bonds) was degassed by first freezing in liquid nitrogen and evacuating the vessel with a vacuum pump. The appropriate amount of tetrafluorohydrazine (2.06 gm., 0.0198 mole) was introduced into the reaction zone to give a total initial pressure slightly below atmospheric (730 mm.). At the end of 113 hours the pressure was 568 mm. After isolation of the completely soluble polymer by distillation of the solvent followed by final drying in vacuo, it was analyzed for nitrogen and fluorine (percent N=7.11 and percent F=18.9). These values correspond to an $NF_2$ content in the product of 26.4% and 25.9%, respectively and thus the 24% saturation of the initial polymer double bonds.

*Example 2*

A series of reactions were carried out in which various polymers were reacted with tetrafluorohydrazine at approximately room temperature (23° C.) and under superatmospheric pressure, while exposed to ionizing radiation emitting from a Cobalt 60 source. Each reaction was run in stainless steel bombs of 5 to 10 ml. volume by first introducing the polymer dissolved in the specified solvent, cooling the bomb with liquid nitrogen, evacuating the air from the bomb by means of a vacuum pump and thereafter adding the designated amount of tetrafluorohydrazine to the bomb and irradiating the mixture for the specified period of time. After the reaction excess tetrafluorohydrazine was recovered by holding the finger bomb at −78° C. in a Dry Ice bath and distilling the $N_2F_4$ into a trap cooled with liquid nitrogen. The solvent was then stripped from the soluble portion of the polymer product after the precipitated polymer had been removed. Both polymer fractions were then dried completely in vacuo and evaluated. Elemental analysis for percent N was carried out both by the Dumas and the Carius methods and for percent F both by combustion for total fluorine (Schöniger) and by digestion with alcoholic KOH for hydrolyzable or N-F fluorine. Both methods of fluorine analysis gave essentially the same results, demonstrating that treatment with tetrafluorohydrazine introduced $NF_2$ rather than C-F groups into the polymer.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

IRRADIATION OF VARIOUS POLYMERS AND TETRAFLUOROHYDRAZINE

| Run | Polymer | Mol. Wt. | Polymer Conc., Wt. percent | $N_2F_4$ Press., p.s.i.a. | Time, Hours | $N_2F_4$/ Double Bond | Radiation Dose, mr. | Product Characteristics | | | Density, g./cc. |
|---|---|---|---|---|---|---|---|---|---|---|---|
| | | | | | | | | Soluble Polymer, Wt. percent | $NF_2$ Content, Wt. percent [1] | Impact Sensitivity,[2] kg. in. | |
| A | Cis-1,4-polybutadiene | ~100,000 | [3] 10.0 | 340 | 18.5 | 6.0/1 | 33.5 | 55 | [4] 38, 42 | 8 | 1.18 |
| B | Trans-1,4-polybutadiene | ~100,000 | [3] 10.0 | 312 | 17.3 | 6.9/1 | 31.3 | 88 | 35 | 14 | 1.16 |
| C | Sodium polymerized polybutadiene (50/50 1,2/1,4) | ~8,000 | [5] 22 | 50 | 20.3 | 2.9 | 3.2 | 100 | 15 | | |
| D | Sodium polymerized polybutadiene (50/50 1,2/1,4) | ~8,000 | [5] 22 | 250 | 15.9 | 3.4 | 1.0 | 100 | 26 | | 1.05 |
| E | Sodium polymerized polybutadiene (50/50 1,2/1,4) | ~8,000 | [6] 23 | 90 | 23.3 | 1.4 | 20.5 | 20 | [4] 37, 38 | | 1.11 |
| F | 1,4-polychloroprene | ~100,000 | [3] 10.0 | 322 | 17.5 | 13.0/1 | 31.7 | 100 | 20 | | |
| G | Cis-1,4-polyisoprene | ~50,000 | [3] 5.5 | 363 | 17.1 | 19.2/1 | 30.7 | 52 | [4] 40, 36 | | 1.24 |
| H | Cis-1,4-polyisoprene | ~50,000 | [6] 10.4 | 345 | 21.4 | 11.6/1 | 30.6 | 11 | [4] 35, 38 | | 1.24 |

[1] Determined by Dumas analysis for percent N, and percent F by alkaline hydrolysis in alcohol.
[2] RDX=20; Tetryl=26.
[3] Solvent was chloroform.
[4] These figures represent the difluoroamine content of the insoluble fraction of the product.
[5] Solvent was hexane.
[6] Solvent was benzene.

Infrared inspection of the products from runs C, D, and E showed a decrease in the double bond peaks at 5.5, 6.2, 10.1, 10.3 and 11.0 microns as increasing amounts of the $NF_2$ groups were introduced. The increased absorption at 11.7 and 12.3 microns are attributed to the $NF_2$ group. FIGURE 1 is the infrared spectrum of polybutadiene containing 15 wt. percent difluoroamine (Run C). FIGURES 2 and 3 are also infrared spectra of the same polymer containing 26 wt. percent and 37 wt. percent difluoroamine, respectively (Runs D and E). All of the foregoing infrared inspections were made in 0.213 mm. cells with 4 wt. percent solutions of the polymer in chloroform.

The products burn with a flash when heated in a flame, and decompose to leave a small carbon residue on determination of impact sensitivity.

*Example 3*

Higher temperatures rather than radiation may also be used to promote reaction. These runs were carried out as described in Example 2 except that the bomb was heated rather than irradiated. The results are set forth below:

What is claimed is:
1. Unsaturated polymers having a viscosity average molecular weight of about 1,000 to 100,000 selected from the group consisting of polybutadiene, polyisoprene, polychloroprene, mixed $C_4$ to $C_6$ diolefin hydrocarbon polymers and natural hydrocarbon rubber, said polymers being modified to contain one $NF_2$ group per 3 to 6 carbon atoms.

2. Polybutadiene having a viscosity average molecular weight of about 1,000 to 100,000 and modified to contain one $NF_2$ group per 3 to 6 carbon atoms.

3. Process for modifying unsaturated polymers to make them contain $NF_2$ groups, said polymers being selected from the group consisting of polybutadiene, polyisoprene, polychloroprene, mixed $C_4$ to $C_6$ diolefin hydrocarbon polymers and natural hydrocarbon rubber, which comprises reacting $N_2F_4$ with the selected unsaturated polymers in a reaction zone to add reacted $N_2F_4$ as difluoroamino radicals to unsaturated bonds of the polymers, and recovering thus reacted and modified polymers containing one $NF_2$ group per 3 to 6 carbon atoms.

ADDITION OF $N_2F_4$ TO HYDROCARBON POLYMERS AT ELEVATED TEMPERATURES

| Feed Polymer | Sodium Polymerized Polybutadiene (Mixed 1,2/1,4) | Natural Rubber | Cis-1, 4-Polybutadiene |
|---|---|---|---|
| Polymer mol. weight | 1500 | ~20,000 | ~100,000. |
| Conc. in benzene (wt. percent) | 11.6 | 16.0 | 9.4. |
| Temperature (° C.) | 65 | 60 | 65. |
| $N_2F_4$ Pressure (p.s.i.a.) | 345 | 340 | 338. |
| Time (hours) | 18.7 | 16.0 | 16.5. |
| Product: | | | |
| Solubility | 100% in $CH_3NO_2$ | 100% in benzene | Insoluble. |
| Appearance | Hard, tan rubber | Brown rubber | Hard, brown rubber. |
| Percent F | 40.3 (equiv. to 55% $N_2F_4$) | 38.5 (equiv. to 53% $N_2F_4$) | 38.3 (equiv. to 53% $N_2F_4$). |
| Percent N | 15.7 (equiv. to 58% $N_2F_4$) | 14.3 (equiv. to 53% $N_2F_4$) | 14.2 (equiv. to 53% $N_2F_4$). |
| $N_2F_4$ Consumed | Equiv. to 60% $N_2F_4$ added | | Equiv. to 53% $N_2F_4$. |
| Weight increase | Equiv. to 59% $N_2F_4$ added | | 58%. |
| Double Bonds Saturated by $N_2F_4$ | 72% | 74% | |
| Density (g./cc.) | 1.34 | | |
| Sensitivity | 8 kg. in | | |

Thermal treatment led to the saturation of ⅗ to ¾ of the double bonds in some polymers. Despite the high $NF_2$ content many of the products are completely soluble in hydrocarbon liquids, e.g. benzene.

4. Process as defined in claim 3 wherein the polymers are reacted with $N_2F_4$ at temperatures of 0° to 150° C. under pressures up to 450 p.s.i.a.

5. Process according to claim 3 in which the polymers are reacted with $N_2F_4$ in the presence of high-energy ionizing radiation of at least $1 \times 10^4$ roentgens per hour.

6. Process as defined in claim 3 wherein the polymers are reacted with $N_2F_4$ in an inert solvent at a temperature of 60° C. to 100° C. under a pressure of 200 to 750 p.s.i.a. for about one-half to 18 hours in a reaction zone, after which unreacted $N_2F_4$ is withdrawn from said reaction zone, polymer product containing one $NF_2$ group per 3 to 6 carbon atoms is withdrawn from the reaction zone admixed with said inert solvent, and said polymer product is separated from said solvent.

7. Process for producing polybutadiene-$N_2F_4$ adduct which comprises reacting polybutadiene having a molecular weight of about 1,000 to 100,000 with $N_2F_4$ at a temperature of 0° to about 150° C. under a pressure of 1 atm. to 750 p.s.i.a. for about one-half to 24 hours, and recovering the polybutadiene-$N_2F_4$ adduct product containing one $NF_2$ group per 3 to 6 carbon atoms.

References Cited
UNITED STATES PATENTS

| | | | |
|---|---|---|---|
| 2,484,423 | 10/1949 | Reynolds et al. | 260—89.7 |
| 2,576,502 | 11/1951 | Dalton | 260—89.7 |
| 2,754,291 | 7/1956 | Pollack | 260—89.7 |
| 2,930,683 | 3/1960 | Adelman | 52—0.5 |
| 2,941,352 | 6/1960 | St. John | 52—0.5 |

CARL D. QUARFORTH, *Primary Examiner.*

ROGER L. CAMPBELL, OSCAR R. VERTIZ,
*Examiners.*

B. R. PADGETT, J. W. WHISLER, L. A. SEBASTIAN,
*Assistant Examiners.*